US008132368B2

(12) United States Patent
Mangold et al.

(10) Patent No.: US 8,132,368 B2
(45) Date of Patent: Mar. 13, 2012

(54) WINDOW LIFT APPARATUS, DOOR MODULE, MOTOR VEHICLE DOOR AND METHOD FOR INSTALLATION OF A WINDOW LIFT APPARATUS

(75) Inventors: Claus Mangold, Helsa St. Ottilien (DE); Carsten Huege, Wehretal (DE); Frank Boecker, Hagen (DE); Marko Hermann, Eschwege (DE); Enrico Schliwa, Lauchroeden (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 737 days.

(21) Appl. No.: 12/243,293

(22) Filed: Oct. 1, 2008

(65) Prior Publication Data

US 2009/0145035 A1 Jun. 11, 2009

Related U.S. Application Data

(63) Continuation-in-part of application No. 12/093,609, filed as application No. PCT/EP2006/069784 on Dec. 15, 2006.

(51) Int. Cl.
*B60J 1/16* (2006.01)

(52) U.S. Cl. .......... 49/375

(58) Field of Classification Search .......... 49/374, 49/502

See application file for complete search history.

(56) References Cited

U.S. PATENT DOCUMENTS

| | | | | |
|---|---|---|---|---|
| 4,991,351 | A * | 2/1991 | Bertolini | 49/351 |
| 5,692,273 | A * | 12/1997 | Rodde | 24/541 |
| 6,205,711 | B1 * | 3/2001 | Klippert | 49/375 |
| 6,330,764 | B1 * | 12/2001 | Klosterman | 49/375 |
| 6,460,296 | B1 | 10/2002 | Arquevaux | |
| 6,557,302 | B1 * | 5/2003 | Kaps | 49/375 |
| 7,055,284 | B2 * | 6/2006 | Napoli et al. | 49/349 |
| 7,409,797 | B2 * | 8/2008 | Pound et al. | 49/375 |
| 7,721,487 | B2 * | 5/2010 | Costigan et al. | 49/375 |
| 2002/0050100 | A1 * | 5/2002 | Tatsumi et al. | 49/375 |
| 2006/0130407 | A1 * | 6/2006 | Castellon | 49/375 |
| 2006/0185248 | A1 | 8/2006 | Köllner | |
| 2007/0006533 | A1 * | 1/2007 | Dedrich et al. | 49/375 |
| 2007/0151161 | A1 * | 7/2007 | Hernandez et al. | 49/375 |
| 2008/0098657 | A1 * | 5/2008 | Campbell et al. | 49/375 |

FOREIGN PATENT DOCUMENTS

| | | | |
|---|---|---|---|
| DE | 102004017645 | A1 | 11/2005 |
| DE | 10255461 | A1 | 6/2008 |
| FR | 2781006 | A1 | 1/2000 |
| FR | 2830894 | A1 | 4/2003 |
| JP | 63235123 | A * | 9/1988 |
| WO | 2005095745 | A1 | 10/2005 |

OTHER PUBLICATIONS

English translation of the International Preliminary Report on Patentability for PCT/EP2006/069784.

English translation of the Written Opinion for PCT/EP2006/069784.

* cited by examiner

*Primary Examiner* — Jerry Redman

(74) *Attorney, Agent, or Firm* — Timothy X. Gibson, Esq.; Gibson & Dernier LLP

(57) ABSTRACT

A window lift arrangement with a lifter for a window pane, a door panel, positioning instruments for positioning the lifter relative to the door panel in an installation position for installation of the window pane, wherein the positioning instruments can assume a first and a second position, wherein the positioning instruments in the first position define the installation position and wherein the positioning instruments in the second position enable movement of the lifter for opening and closing the installed window pane.

13 Claims, 17 Drawing Sheets

WINDOW LIFT APPARATUS, DOOR MODULE, MOTOR VEHICLE DOOR AND METHOD FOR INSTALLATION OF A WINDOW LIFT APPARATUS

CROSS-REFERENCE TO RELATED APPLICATION

This application is a continuation in part of and claims the benefit of Phase patent application Ser. No. 12/093,609, filed May 14, 2008 and International PCT Application PCT/EP2006/069784 filed Dec. 15, 2006, the entire disclosures of which are hereby incorporated by reference.

BACKGROUND

The invention concerns a window lift arrangement, a door module with a window lift arrangement, a motor vehicle door with a window lift arrangement, and a procedure for installation of a window lift arrangement.

The starting point of this invention is the window lift arrangement known from DE 10 2004 017 645 A1, whose disclosure content is herewith fully incorporated into this application by means of reference. Instruments for positioning and fixing the lifter to simplify the installation of a window pane are known from this. Included in the embodiment disclosed there are instruments for positioning and fixing the lifter by means of two support brackets [prisms], which are molded in one piece on the wall section, e.g. the door panel, and are used as lower stops for the lifter.

So-called trackless window lift arrangements, of the type mentioned in DE 10 2004 017 645 A1, which get by without a cam chain guide [guide rail] for the lifter, are also disclosed in DE 102 55 461 A1 and DE 10 2005 037 324, the latter still unpublished at the time of application.

A device for connecting a window pane with the lifter of a window lift by means of a snap connection is known from DE 195 05 624 C2.

A door panel, which is used as a support for various elements of a window lift, is known from DE 202 18 678 U1. The door panel has an opening for installing the window lift from the inside of the door.

SUMMARY OF THE INVENTION

The task which forms the basis of the invention is to create an improved window lift arrangement, an improved door module, an improved motor vehicle door with a window lift arrangement and a procedure for installation of a window lift arrangement, in order to simplify the installation in particular of a window pane with a large glass drop.

In accordance with the invention, a window lift arrangement with a lifter for a window pane is created. The window lift arrangement has a door panel and positioning means for positioning the lifter in an installation position for installation of the window pane. A lifter is the part of a mechanism for raising and lowering a window that is engaged with the window. A lifter can also be referred to as a driver. A door panel is a panel mounted on the inside of a door upon which the mechanism for raising and lowering the window is mounted. The door panel can also be referred to as an inner door panel.

The positioning means can assume a first and a second position. In the first position, the positioning means define the installation position and in the second position the positioning means release a movement of the lifter for opening or closing the installed window pane. The positioning means is comprised of one or more positioning elements.

The design of the positioning means according to the invention has the advantage that the positioning means do not simultaneously define the maximum opening of the window pane, as is the case in DE 10 2004 017 645 A1. Rather, the positioning means can in principle be arranged anywhere desired along the traverse path of the lifter. This is of particular advantage for the installation of a window lift arrangement in which the window pane can be counter sunk completely or almost completely in the door. The degree of lowerability of the window pane in the motor vehicle door is also called the "glass drop", wherein a glass drop of 100% means that the window pane is completely lowerable.

In the case of a completely or almost completely lowerable window pane, the window pane does not protrude or almost does not protrude over the upper door trim in its completely opened position, which makes installation in the completely opened position rather difficult. The invention, on the other hand, enables the positioning means to be arranged so that the window pane protrudes over the upper door trim in the installation position, even if it pertains to a window lift with a large glass drop, particularly a glass drop of 100%. In the installation position, therefore, the section of the window pane protruding over the upper door trim can be easily grasped, which makes installation considerably easier. This is achieved by mounting the positioning elements in a middle area of the door panel.

One or more of the positioning elements is removably mounted on the door panel and supports the lifter in the first position. Embodiments of the invention provide for the second position of one or more of the positioning elements as being completely removed from the door panel. The removal of the positioning elements is of great benefit because it reduces the weight of the automobile and improves its fuel economy.

In one embodiment of the invention, the positioning elements are movably-mounted on the door panel and designed for detachable fixing of the lifter in the first position. For example, the positioning elements can be rotatable and/or movable, so that a selection can be made between the first and second position. The positioning elements can also be completely or partially detachable from the door panel after the window pane has been installed.

In one embodiment of the invention, the positioning elements of have a surface in contact with the lifter in the first position. The surface of the positioning element and the lifter interlock to restrict the motion of the lifter while the positioning element is in the first position. Further, the surfaces are designed to automatically align themselves during assembly into the first position. These interlocking surfaces have the advantage of being and quick easy to assemble. This reduces the cost of labor for installing windows.

In one embodiment of the invention, the cable which is adapted to operate the lifter during normal operation functions as a positioning element in conjunction with the interlocking surfaces. The interlocking surfaces restrict the motion of the lifter, and the cable removes the remaining degrees of freedom of motion and completely defines the position of the lifter in the first position. The cable is a normal component of the window drive lift. This has the advantage that the cable does not need to be removed. This embodiment provides for a simplified design.

In an embodiment of the invention, one or more of the positioning elements is buttressed in the first position by a protrusion extending out of the door panel. This has the advantage that a positioning element can be mounted in a hole in the door panel. The hole in which the positioning element is mounted will not need to support the full force exerted on the lifter during the installation of a window pane.

In an embodiment of the invention, the positioning element is slideably engaged between the protrusion and the lifter. This has the advantage of making it easy to move the positioning element into the second position. The positioning element can simply be slid out of the door panel and placed into the second position.

In an embodiment of the invention, the slideably engaged positioning element is held in place by a clipping means. This has the advantage that it is easy for an operator to move the positioning element into the second position. The clipping means can be unclipped and the positioning elements can simply be slid out of the first position.

In one embodiment of the invention, clamping elements for fastening the positioning elements in the second position can be part of the positioning elements or the door panel. In this way, the positioning elements are held securely in their second position after installation, so that they cannot disrupt the movement of the lifter during opening and closing the window pane.

In one embodiment of the invention, the positioning means is designed to absorb the force initiated for creating a snap-in connection between the lifter and the window pane. If this is not the case, a drive element such as a hauling rope is attached to the lifter before installation of the window pane, if the window lift is designed as a cable pull window lift. In this case the hauling rope can absorb the force with which the window pane is pressed into the lifter for creating the snap-in connection.

In another aspect, the invention concerns a door module with a lift arrangement. The door module is comprised of a lifter for a window pane, a door panel, and positioning elements according to the invention.

In another aspect, the invention concerns a door module or a motor vehicle door with a window lift arrangement according to the invention. For example it pertains to a window lift arrangement without guide rails for the lifter and a relatively large glass drop, of almost 100% for example.

In another aspect, the invention concerns a procedure for installation of a window lift arrangement. For installation, the lifter is first positioned by bringing the positioning means into the first position. After the lifter is connected to the window pane, by snapping it or locking it into place. For example, the positioning means are brought into a second position, in which the movement of the lifter for opening or closing the installed window pane is released.

In another aspect, the positioning elements can be preinstalled into the door panel. This allows for a more rapid and efficient work flow. Additionally, one or more of the positioning elements can be removed from the first position and placed position by removing the positioning element from the door panel and placing it into a storage receptacle. This has the advantage that the positioning element is not within the automobile. This reduces the weight and increases the fuel economy of the automobile. Placing the positioning element into a storage receptacle is an advantage because the positioning elements can be reused.

BRIEF DESCRIPTION OF THE DRAWINGS

Embodiments of the invention with reference to the drawings are described in more detail below. The following are shown.

DETAILED DESCRIPTION OF THE INVENTION

In the following description of embodiments of the invention, elements that correspond to one another are identified with the same reference marks.

Figure 1:
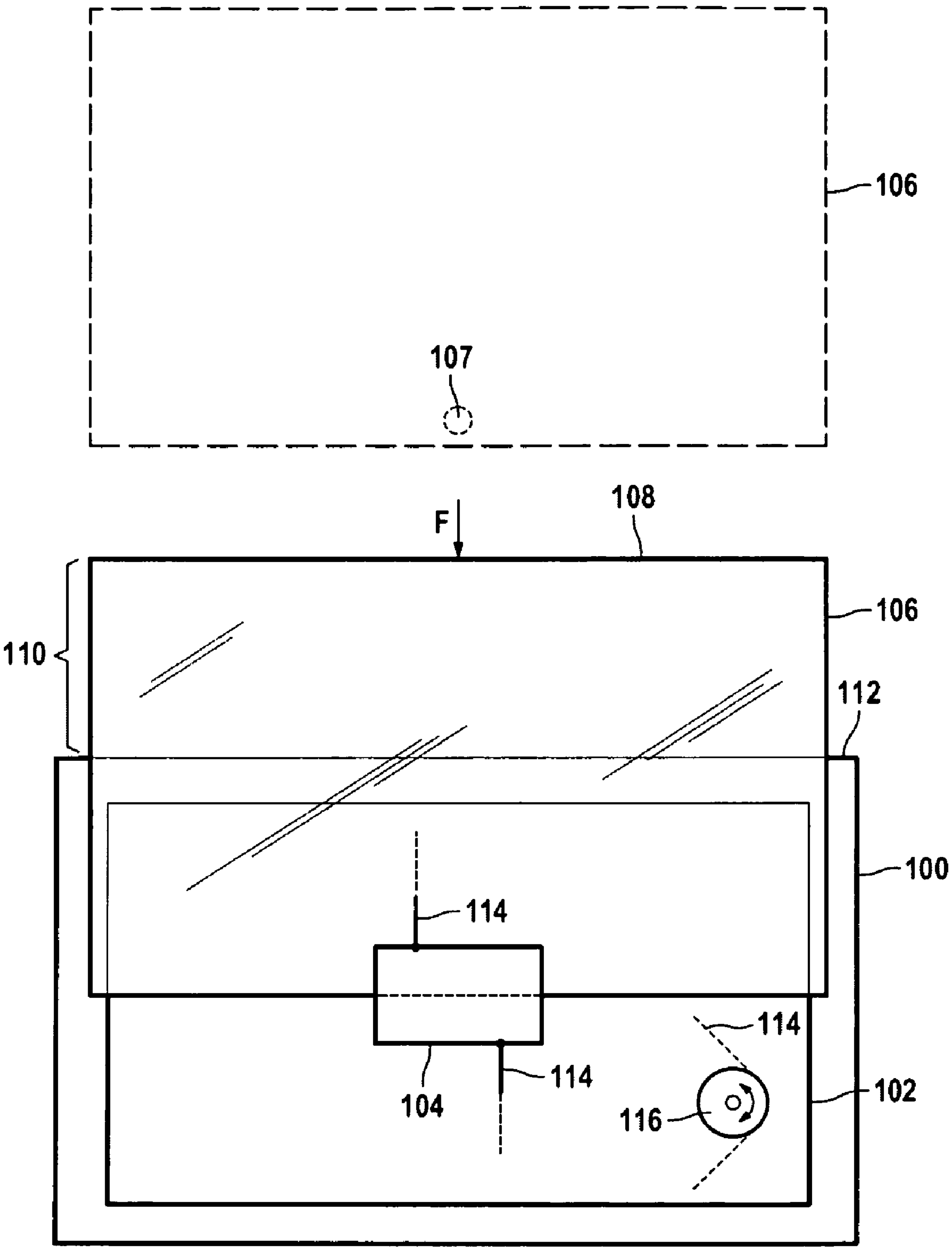
FIG. 1 A schematic depiction of an embodiment of a motor vehicle door according to the invention.

FIG. 1 shows a motor vehicle door 100 with an door panel 102, door panel 102 is used as a support, for example for various drive elements of a window lift arrangement. At the same time, the door panel can be used as a partition wall between a wet area and a dry area of motor vehicle door 100.

The window lift arrangement has a lifter 104 for connecting to a window pane 106. Positioning means are not shown in FIG. 1, and are arranged on door panel 102 and/or lifter 104. The positioning means has a first position for determining an installation position for connecting window pane 106 and lifter 104, and a second position in which a movement of the lifter is released for opening or closing the installed window.

FIG. 1 shows lifter 104 in its installation position, which in the embodiment of the window lift arrangement being observed here is located approximately in the middle of door panel 102. After lifter 104 has been positioned in the installation position, window pane 106 is brought from above out of its position indicated by dotted lines to its installation position shown in solid lines. In the installation position, window pane 106 is connected to lifter 104, in that for example a force F is exerted on upper edge 108 of window pane 106, which causes lifter 104 and window pane 106 to engage in a snap-in connection. For example, window pane 106 may have a hole 107 on its lower edge for creating the snap-in connection with lifter 104.

Of particular advantage in the embodiment shown in FIG. 1 is the fact that area 110 of window pane 106 in its installation position protrudes over upper door trim 112 of motor vehicle door 100. This enables easy installation of window pane 106 and in particular the initiation of force F.

Before or after connecting window pane 106 and lifter 104, lifter 104 is connected to a drive element of the window lift arrangement. The drive element pertains, for example to a cable 114, which is guided via driving drum 116 of the window lift arrangement. Force F exerted for creating the snap-in or snap connection between lifter 104 and window pane 106 is absorbed by the positioning element 120 (cf. FIG. 3) and/or cable 114.

The window lift arrangement of FIG. 1 may pertain to an embodiment with a relatively large glass drop, such as a glass drop of 100% or almost 100%. This means that after installation, window pane 106 can be moved completely or almost completely under upper door trim 112 by activating the window lift arrangement, so that even area 110 of window pane 106 disappears underneath upper door trim 112.

Figure 2:
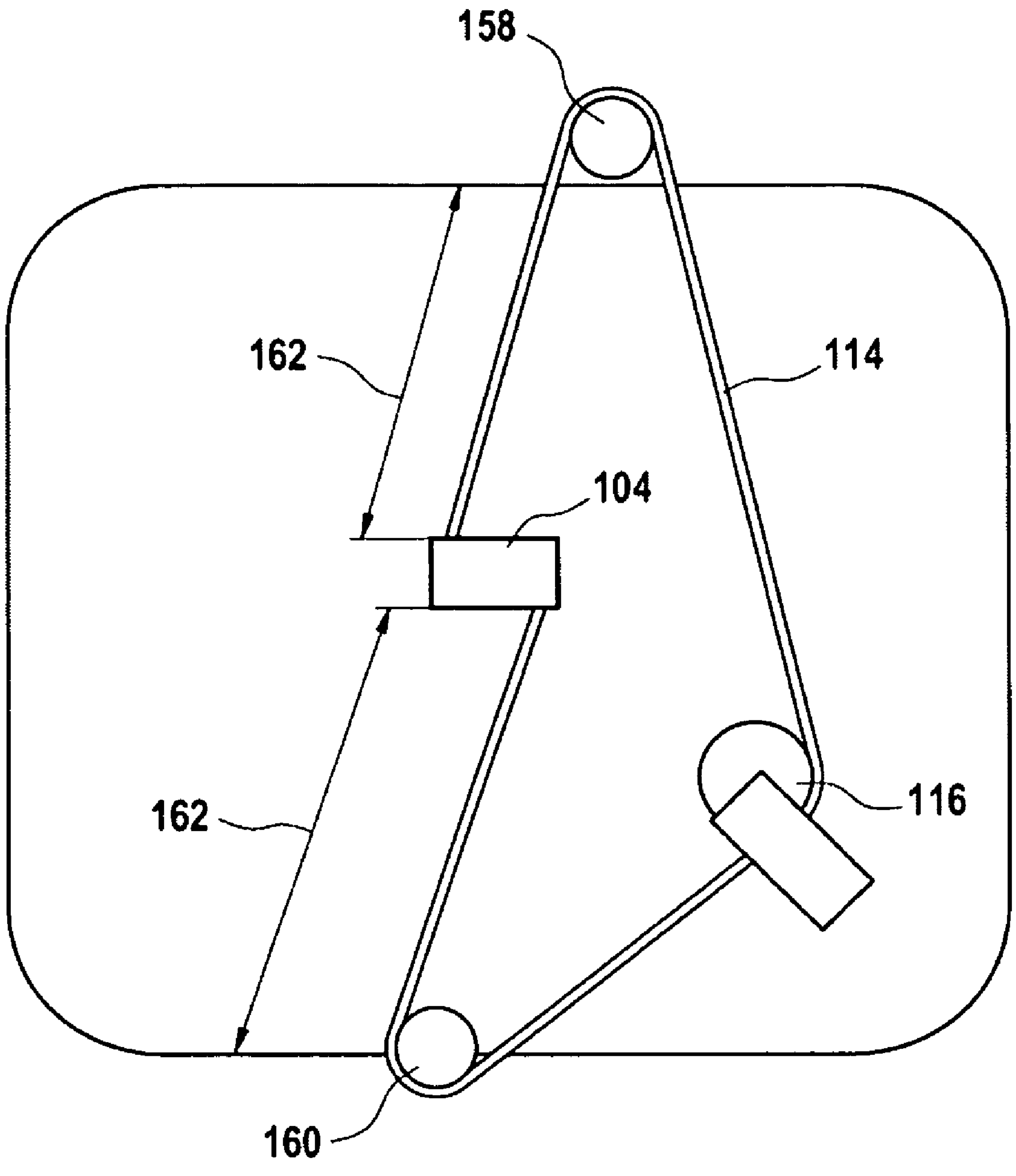
FIG. 2 A schematic diagram of an embodiment of the window lifting mechanism.

FIG. 2 shows a schematic diagram of an embodiment of a window lifting mechanism. In this embodiment the lifter 104 is driven by cables 114. Below the lifter 104 the cable is guided by the cable guide 160. Above the lifter the cable is guided by the upper pulley 158. And the cable is driven by the driving drum 116. When the cable is driven by the driving drum 116, the glass follows a clearly defined path 162.

Figure 3:
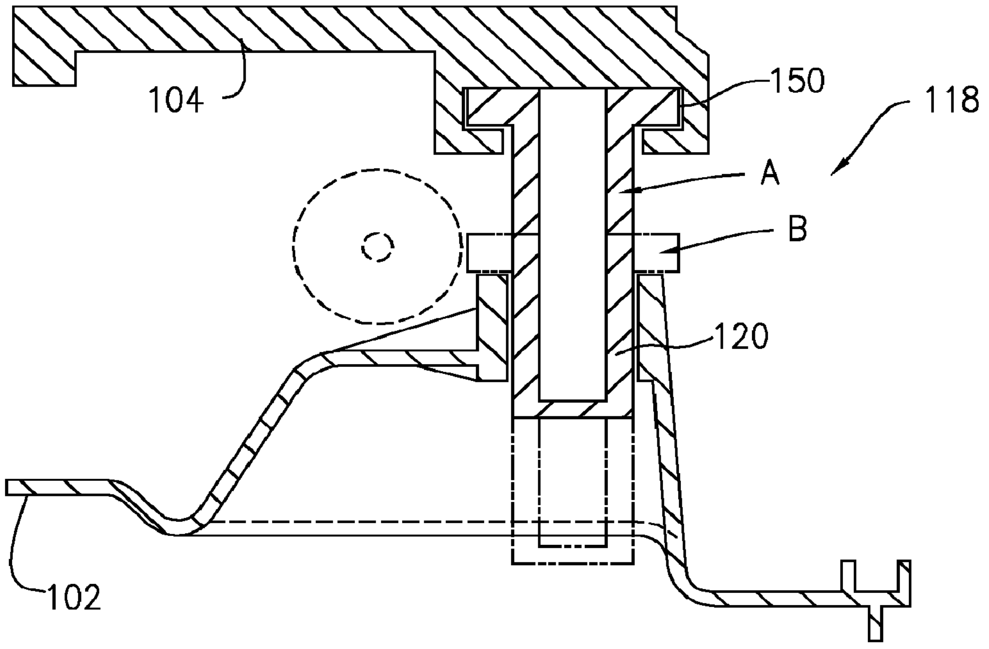
FIG. 3 A sectional view of an embodiment of a positioning means according to the invention taken along line 3-3 in FIG. 4, wherein the positioning means are movably-mounted.

FIG. 3 shows an embodiment of a positioning means 118 with a movably-mounted positioning element 120 almost perpendicular to door panel 102. By means of moving almost perpendicularly to door panel 102, positioning element 120 can be brought into first position A and second position B. In this embodiment, the positioning element is T-shaped at the top in order to be inserted into a respective recess 150 of lifter 104. The positioning instrument 120 is releasable attached to the door panel and can thus be removed.

Figure 4:
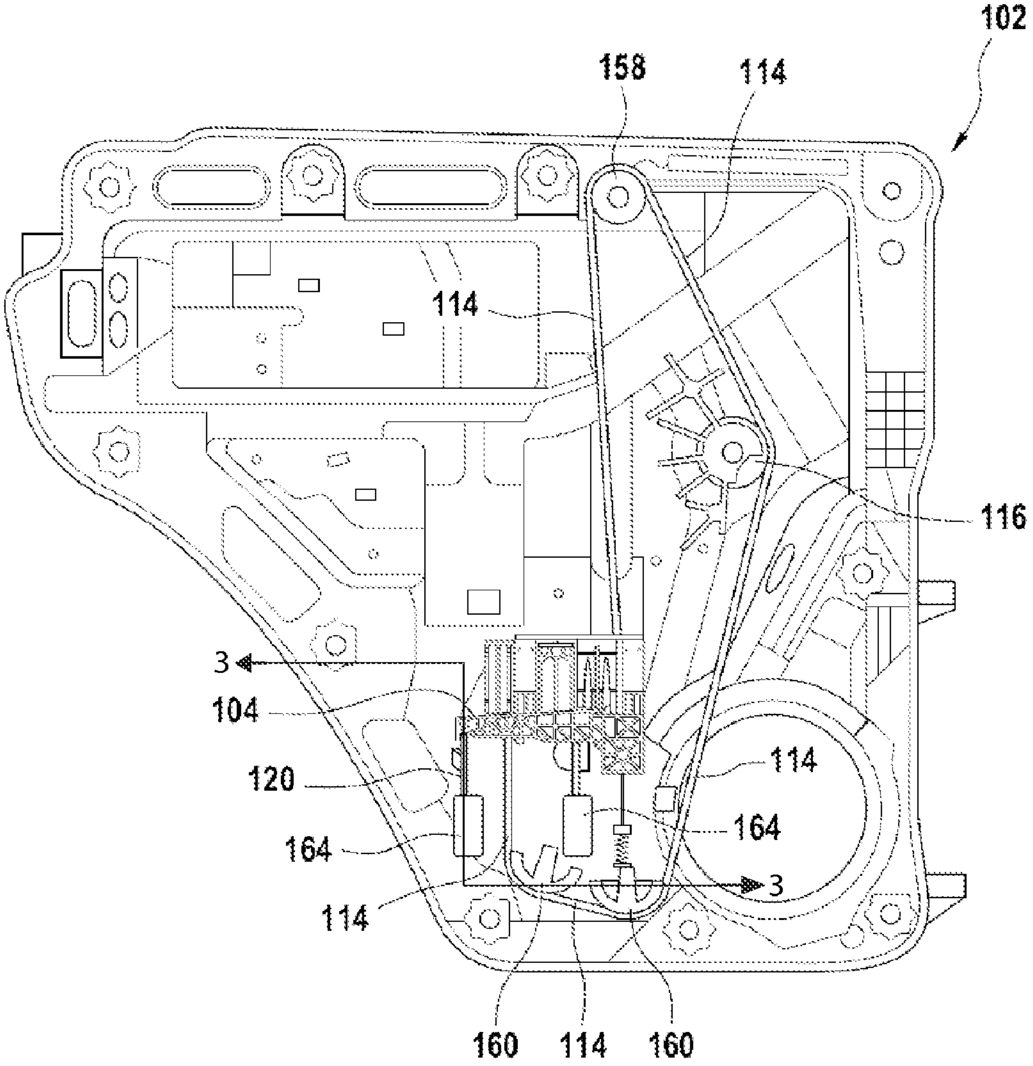
FIG. 4 A side view of an embodiment of a door panel showing the lifter and positioning elements in the first position.

FIGS. 4 through 17 show the same embodiment of the invention. Components with identical numbers in these figures are identical components. In this embodiment, the positioning means 118 is comprised of a positioning element 120 and a cable 114. FIG. 4 shows an exterior side view of an door panel. The door assembly 102 has a cable drive system 114 which moves the lifter 104. The cable above the lifter is guided by upper pulley 158. Below the lifter, the cable is guided by two cable guides 160. The positioning element 120 and the lifter 104 are shown in the first position. In this embodiment the cable 114 also functions as a positioning element. The lifter 104 rests on positioning element 120 and is held in place by the cable 114. The positioning element 120 is inserted through the door panel 102. It is not shown in this figure, but there are two slots 196 through which the positioning element is installed and it is held in place by a snap fit. This is shown in later figures (cf. FIG. 14). The cable is driven by the drive drum 116. The positioning element 120 rests on top of two protrusions 164. A particular advantage of this embodiment is that the position elements rest on top of the protrusions 164. This supports the positioning element during the assembly of the window and distributes the force over a larger area of the door panel.

Figure 5:
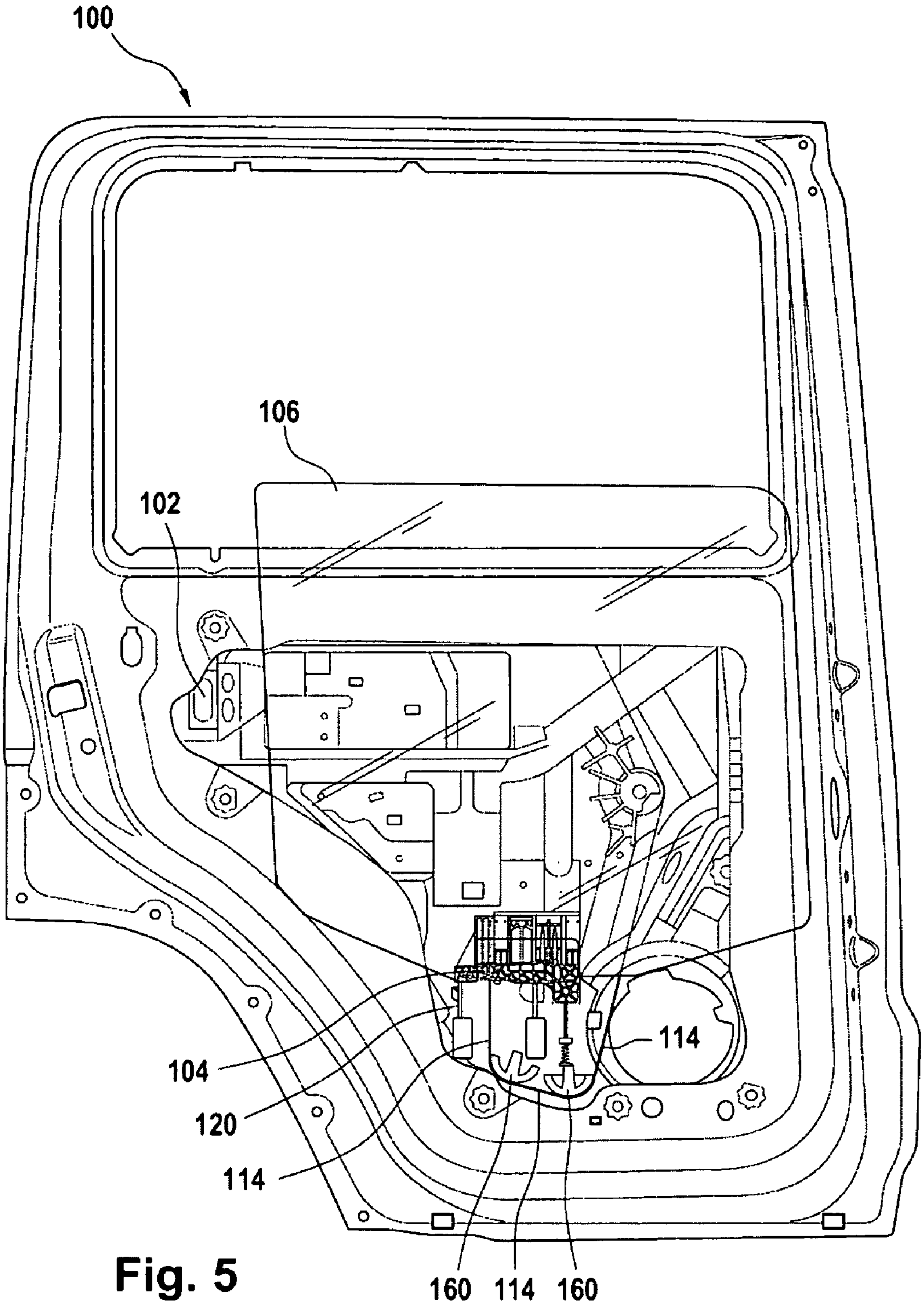
FIG. 5 A side view showing the embodiment of an door panel of FIG. 4 installed in an embodiment of a motor vehicle door with an installed window pane shown from the exterior side of the door.

FIG. 5 shows an exterior view of a complete motor vehicle door. The motor vehicle door 100 is comprised of an door panel 102. A window pane 106 is inserted into the lifter 104. Visible are the cable guides 160, the cable 114 and the lifter 104. The positioning means is in the first position and the window 106 is shown in an engaged position.

Figure 6:
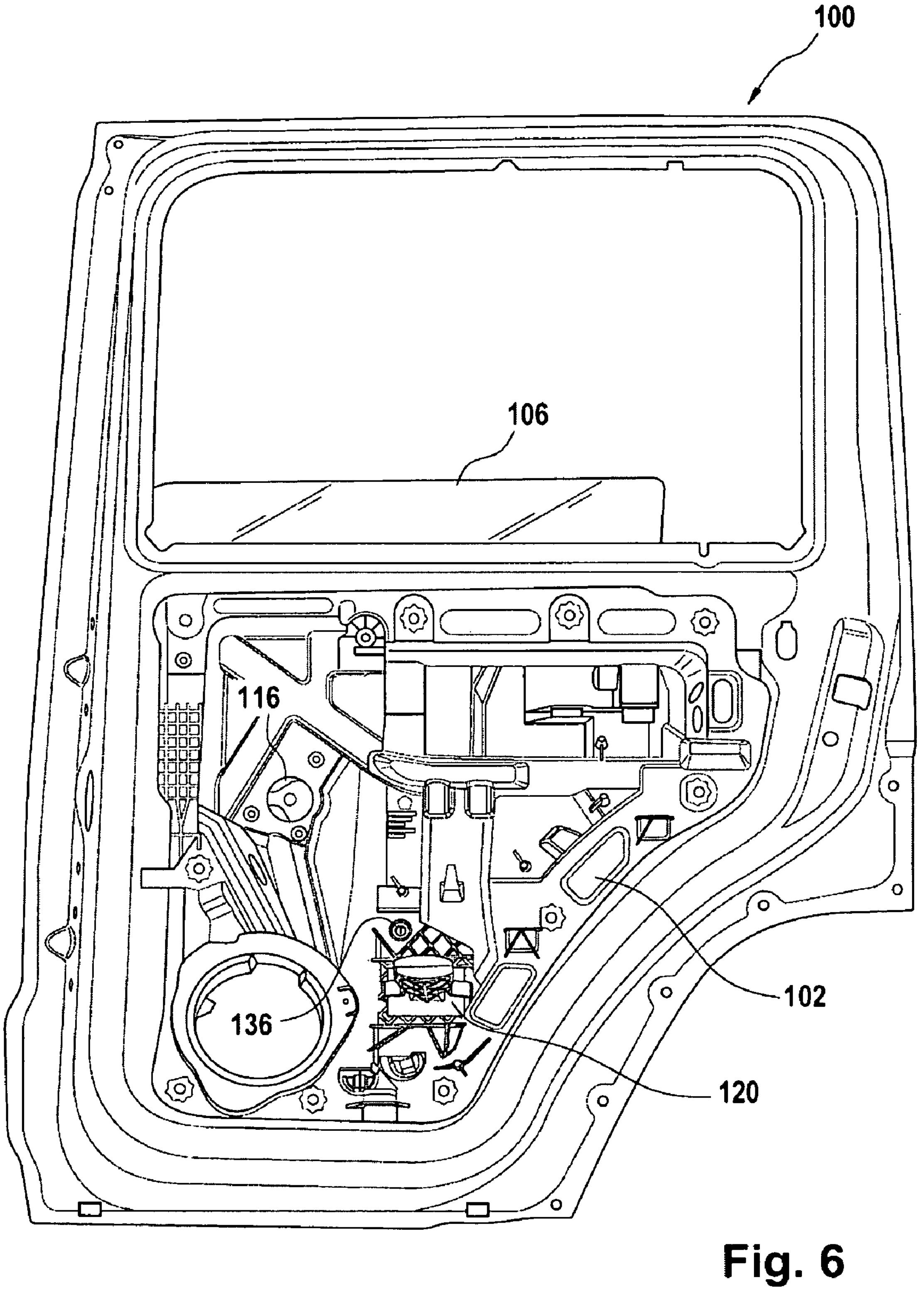
FIG. 6 The same embodiment of a motor vehicle door, an door panel, a positioning means, and a window pane as shown in FIG. 5 viewed from the occupant side of the door.

FIG. 6 shows an interior side view of the same embodiment of the motor vehicle door as was shown in the previous figure. Visible in this figure is the motor vehicle door 100, the window pane 106, the driving drum 116, and the positioning element 120. The positioning element 120 is shown in the first position. Also visible is an installation hole 136. The purpose of the installation hole is to allow the snap element 144, which is not shown in this figure, to be released to allow the window to be removed. The door panel 102 is shown as being assembled into the complete motor vehicle door 100.

Figure 7:
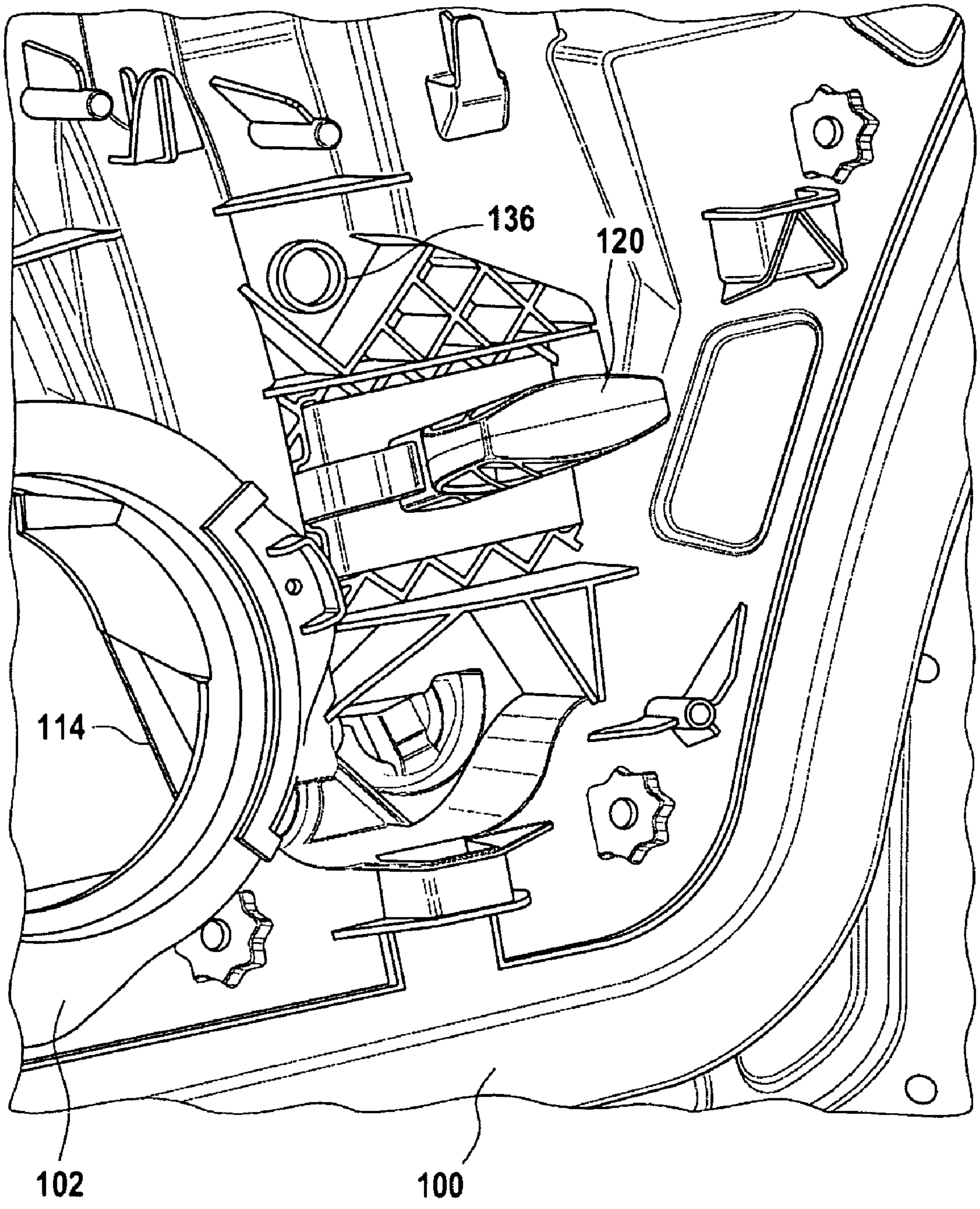
FIG. 7 A close up, perspective view of the same embodiment of a motor vehicle door, door panel, and window pane as shown in FIG. 5 showing the positioning elements and lifter in the first position from the occupant side.

FIG. 7 shows an close-up, perspective of the same motor vehicle door that was shown in the previous figure from the passenger side of the door. The door panel 102 is bolted into the motor vehicle door 100. Visible is the installation hole 136 which is located above the positioning element 120. Since this is a perspective view, a portion of the cable 114, which is mounted on the opposite side of the door, is also visible.

Figure 8:
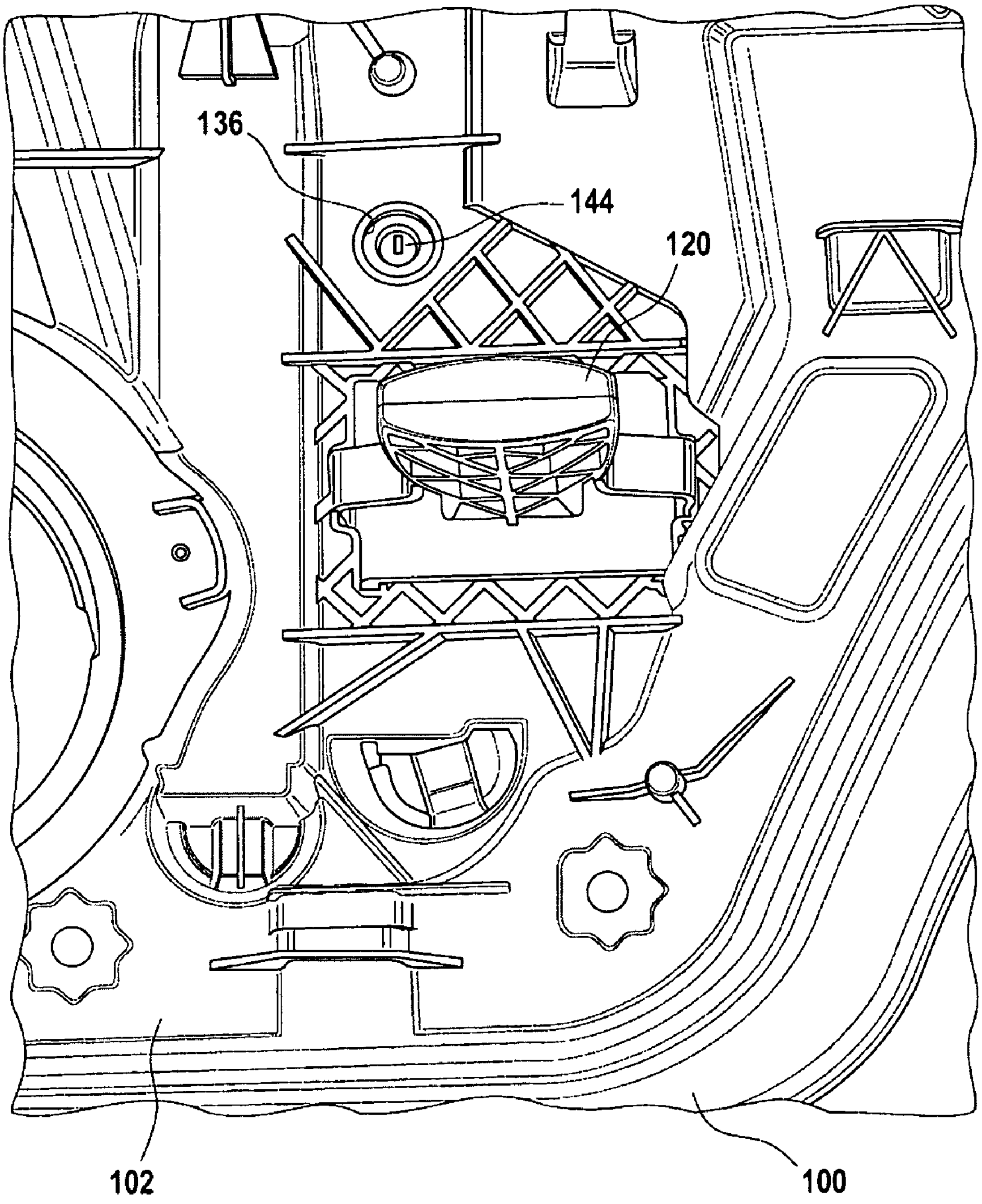
FIG. 8 The same close up, perspective view as was shown in FIG. 7 except viewed from a different angle.

FIG. 8 shows the same interior view of the motor vehicle door 100 as FIG. 7, but from a different angle. Again the door panel 102 is mounted on motor vehicle door 100. And again the installation hole 136 is visible above the positioning element 120. Visible through the installation hole 136 is the snap element 144. In this figure it is very clear that the snap element accessible through this hole, and that the window can be released.

Figure 9:
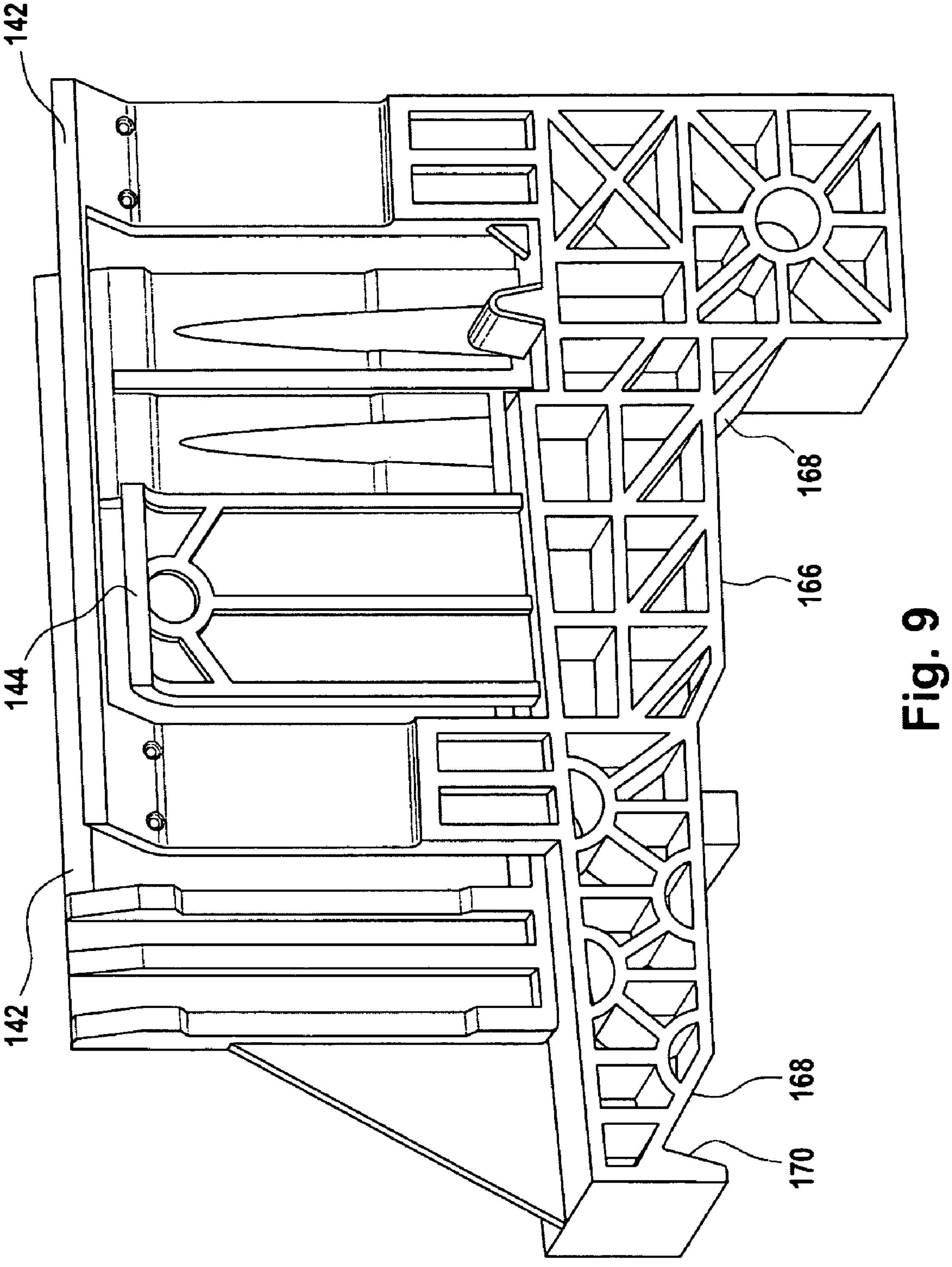
FIG. 9 A perspective view of the embodiment of the lifter shown in FIG. 5.

FIG. 9 shows a perspective view of the lifter 104. On the upper part of the lifter 104, are two flanges 142. The purpose of the flanges is to secure and hold the window pane 106. The window pane 106 is not shown in this figure. The snap element 144, is used to lock into the hole 107 in the window pane. This locks the window in place when it is installed. On the underside of the lifter 104, there is a complex surface. The two sloped surfaces 168 that serve to guide the lifter 104 into proper alignment with the positioning element 120. When in the first position, the lifter 104 and the positioning element have interlocking surfaces. There is an angled surface 170 on the lifter 104 which mates with an angled surface on the positioning element 120. There is also a flat surface 166 on the lifter 104 which mates with another flat surface 170 on the positioning element 120.

Figure 10:
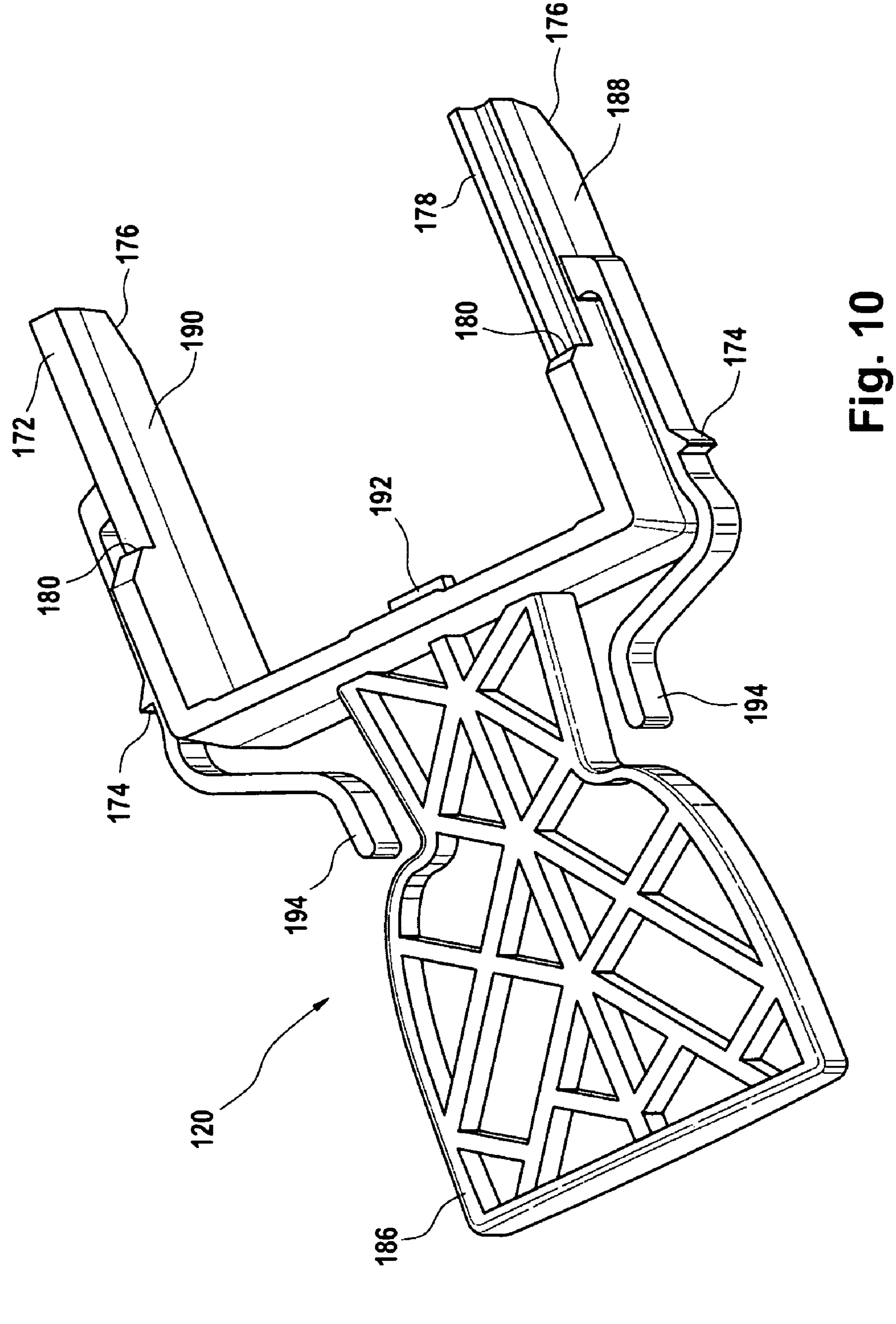
FIG. 10 Perspective view of the embodiment of the positioning means shown in FIG. 6.

FIG. 10 shows a perspective view of an embodiment of a positioning element 120. The positioning element 120 comprises a handle 186 with a first 188 and a second prong 190. Between the two prongs are installation stops 192. When the positioning element 120 is installed into the first position, these stops 192 define how far the positioning element goes into the door panel 102. Each of these prongs has a surface that interlocks with a surface on the lifter 104. The first prong 188 has an angled surface 178 that interlocks with a mating surface for the angled surface 170 on the lifter 104. The second prong 190 has a second flat surface that mates with a first flat surface 166 located on the lifter 104. Each prong 188, 190 also has a lifter stop which is used to partially define the position of the lifter when the positioning element is in the first position. On the side of each prong is a snap connector 174, which locks the positioning element 120 into the first position. The snap connector 174 can be released by depressing the snap connector release 194 in the direction of the handle. The edge surface of the prongs that is in contact with the protrusion features a tapered edge 176, which facilitates the removal of the positioning element from the first position. This is described in more detail below.

Figure 11:
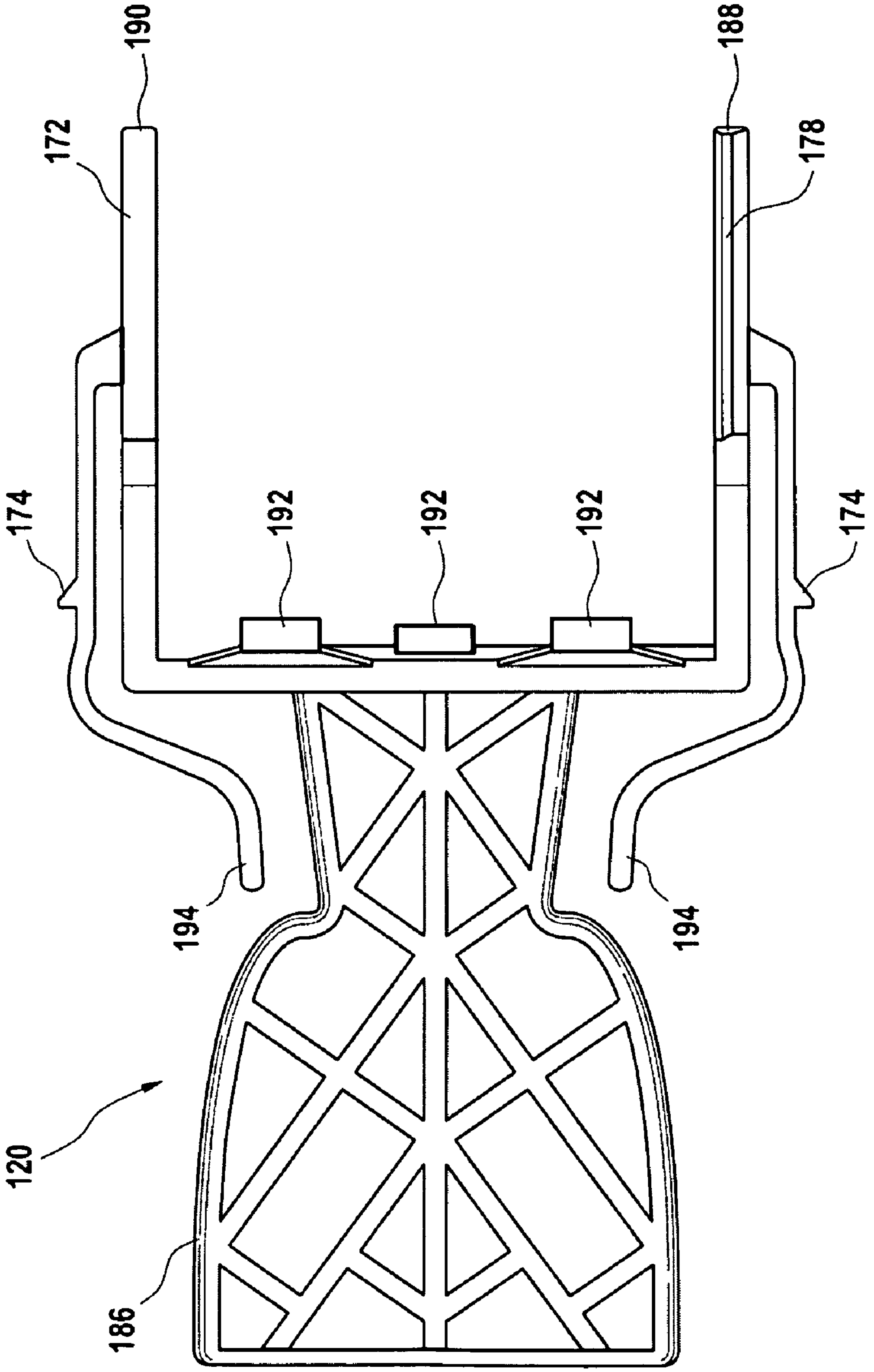
FIG. 11 Top view of the embodiment of the positioning means shown in FIG. 6.

FIG. 11 shows a top view of the same embodiment of a positioning element that was shown in FIG. 10. In this view, the installation stops 192 are more easily visible.

Figure 12:
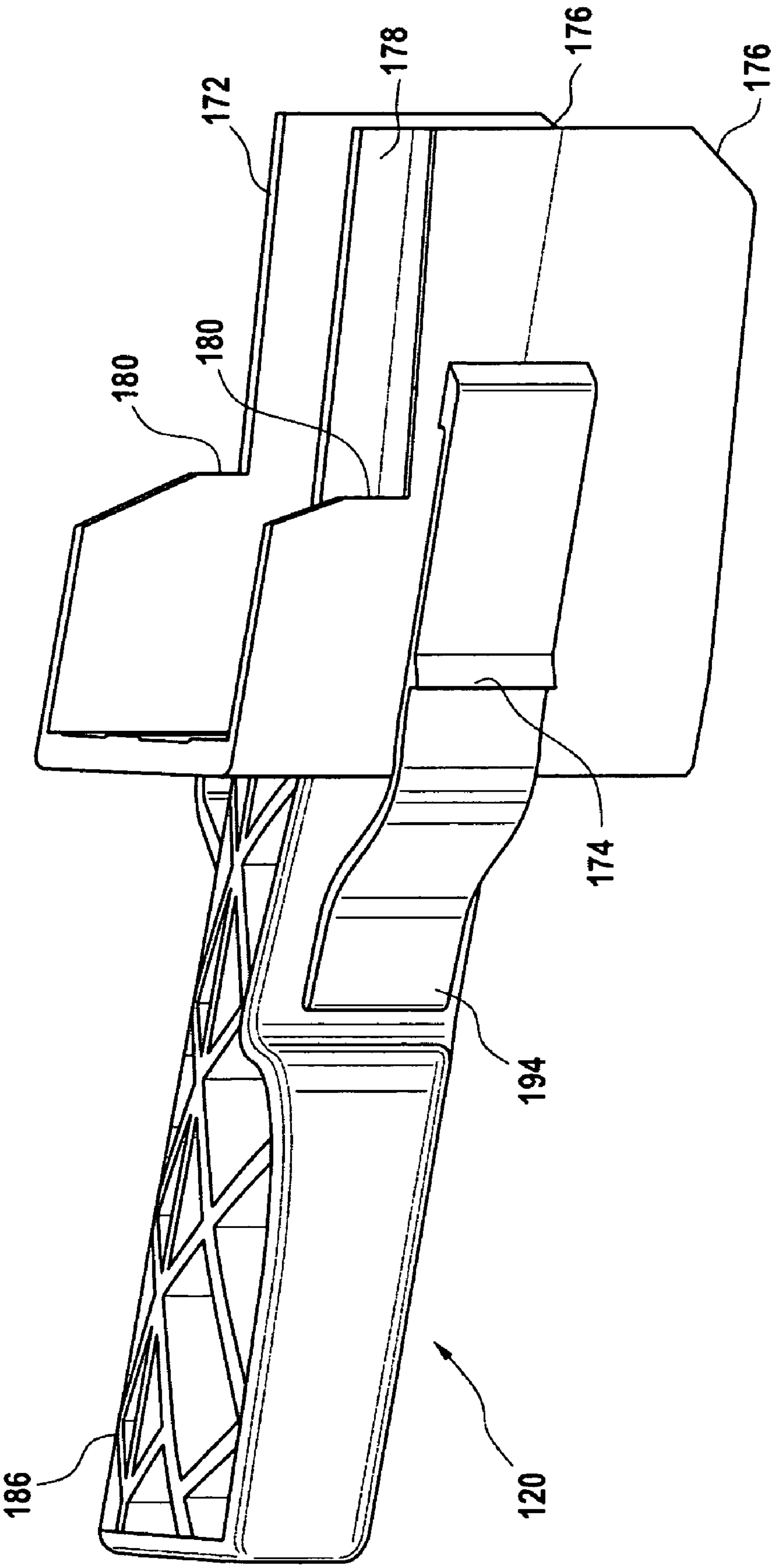
FIG. 12 Side, perspective view of the embodiment of the positioning means shown in FIG. 6.

FIG. 12 shows a side, perspective view of the same positioning element that was shown in FIG. 10.

Figure 13:
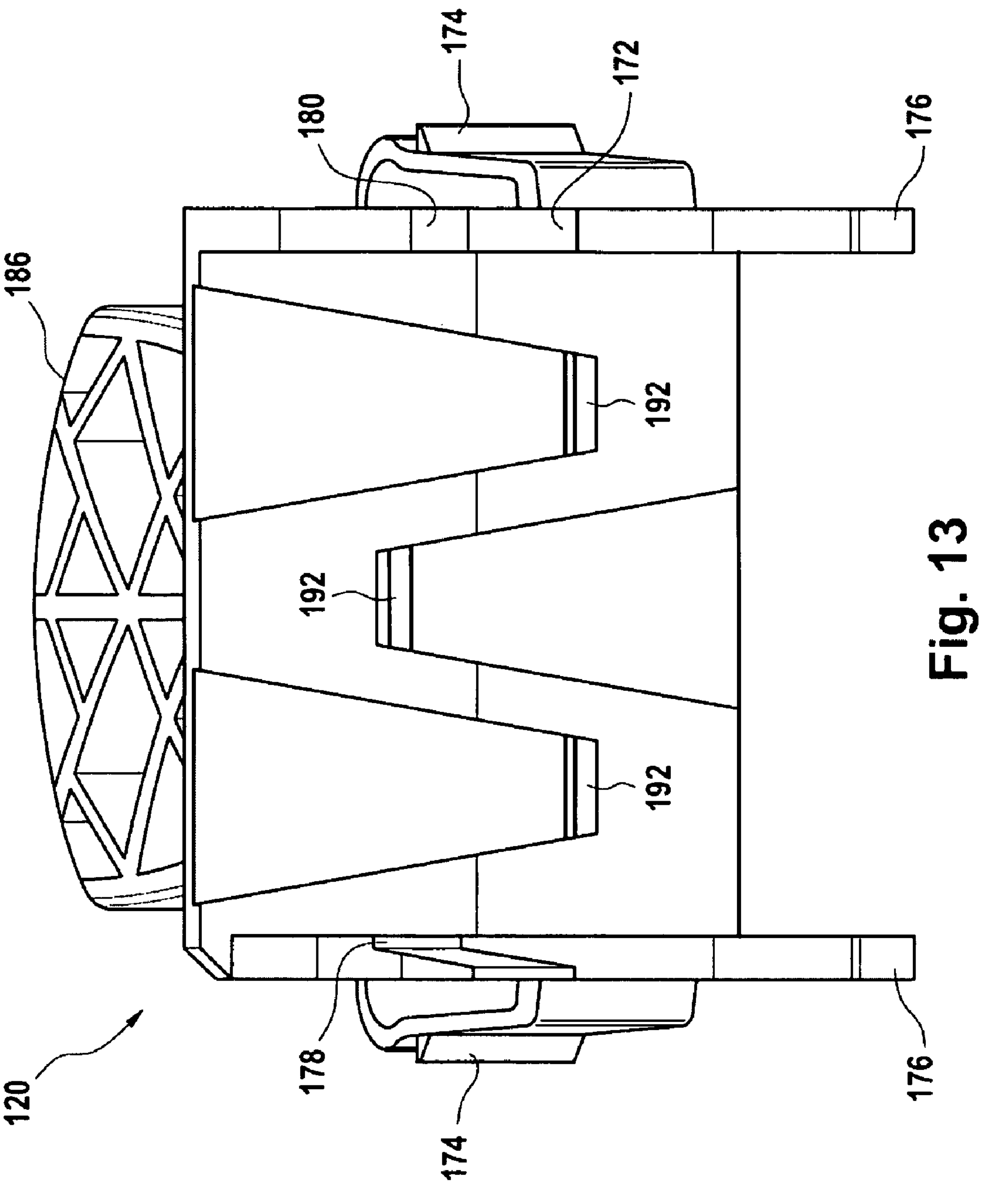
FIG. 13 Front, perspective view of the embodiment of the positioning means shown in FIG. 6.

FIG. 13 shows a front, perspective view of the same positioning element that was shown in FIG. 10.

Figure 14:
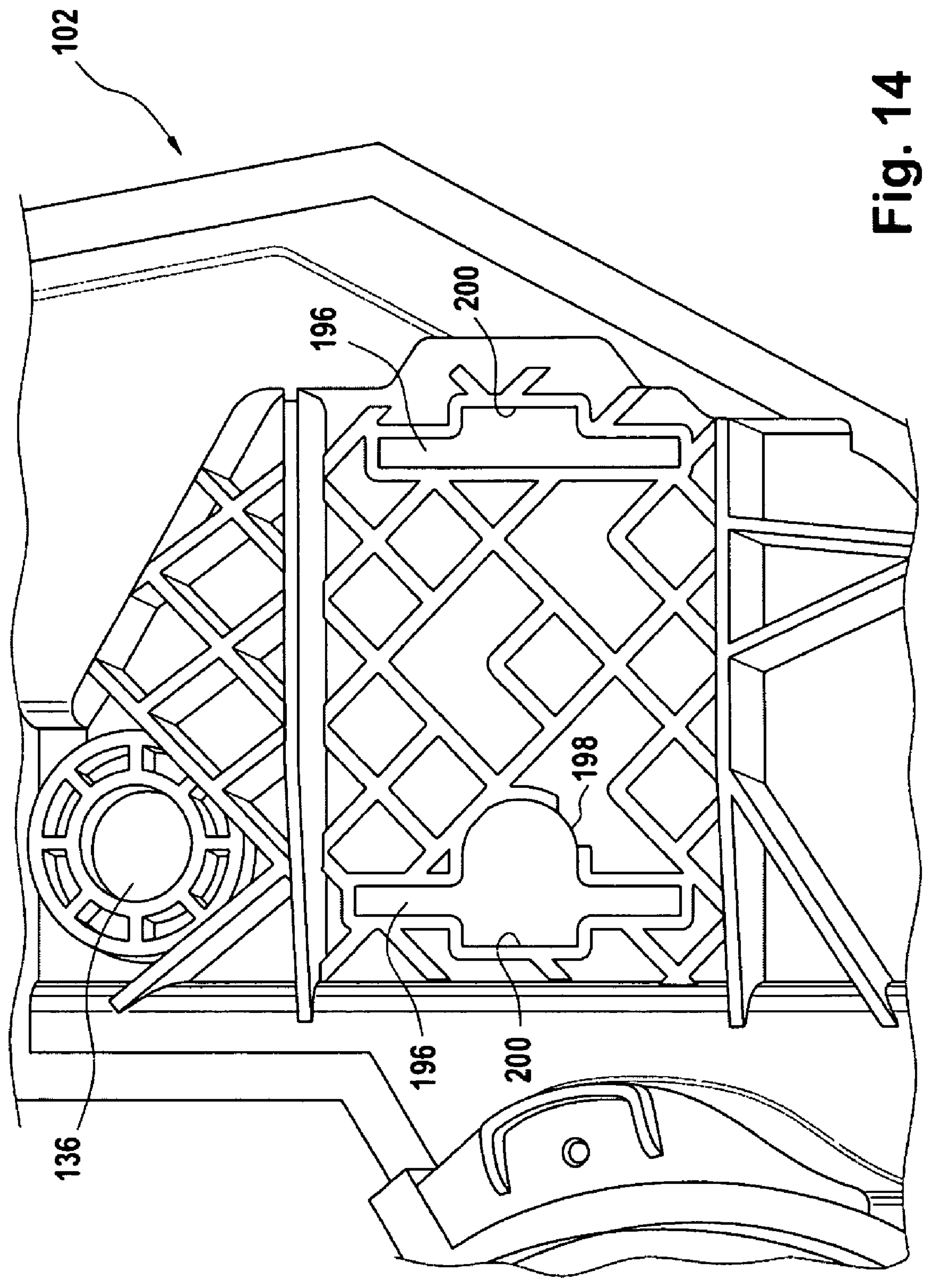
FIG. 14 A close up, side, perspective view of the embodiment of the door panel shown in FIG. 6 as viewed from the occupant side of the door.

FIG. 14 shows a perspective view of a portion of an embodiment of an door panel 102 as viewed from the occupant side of the door. Visible in this figure are slots 196 for installing the positioning element 120. The prongs 188, 190 of the positioning element 120 are inserted into the slots 196. Each slot has a rectangular elongation 200 which provides clearance for the snap connector 174. When the positioning element 120 is fully inserted into the door panel 102, the snap connectors locks the positioning element 120 against the door panel 102. Above one of the slots, an installation hole 136 is visible. When the lifter and the positioning element 120 are in the first position, this hole provides access to the snap element 144. The snap element locks into the hole 107 in the window pane. Access to the snap element is necessary to release and remove the window pane 106. The slot 196 below the installation hole 136 has a circular elongation 198. The circular elongation 198 serves the same function as the installation hole 136. When the window is fully rolled down, the lifter 104 rests on the two protrusions 164. When the lifter is resting on the protrusions 164, the circular elongation provides access to the snap connector 174 in order to release the window pane 106. This additional access to the snap connector is provided in case a window needs to be replaced and the positioning element 120 is not available. The replacement of a window without the positioning element would be more difficult and more time consuming, but it would be possible for a skilled mechanic to perform.

Figure 15:
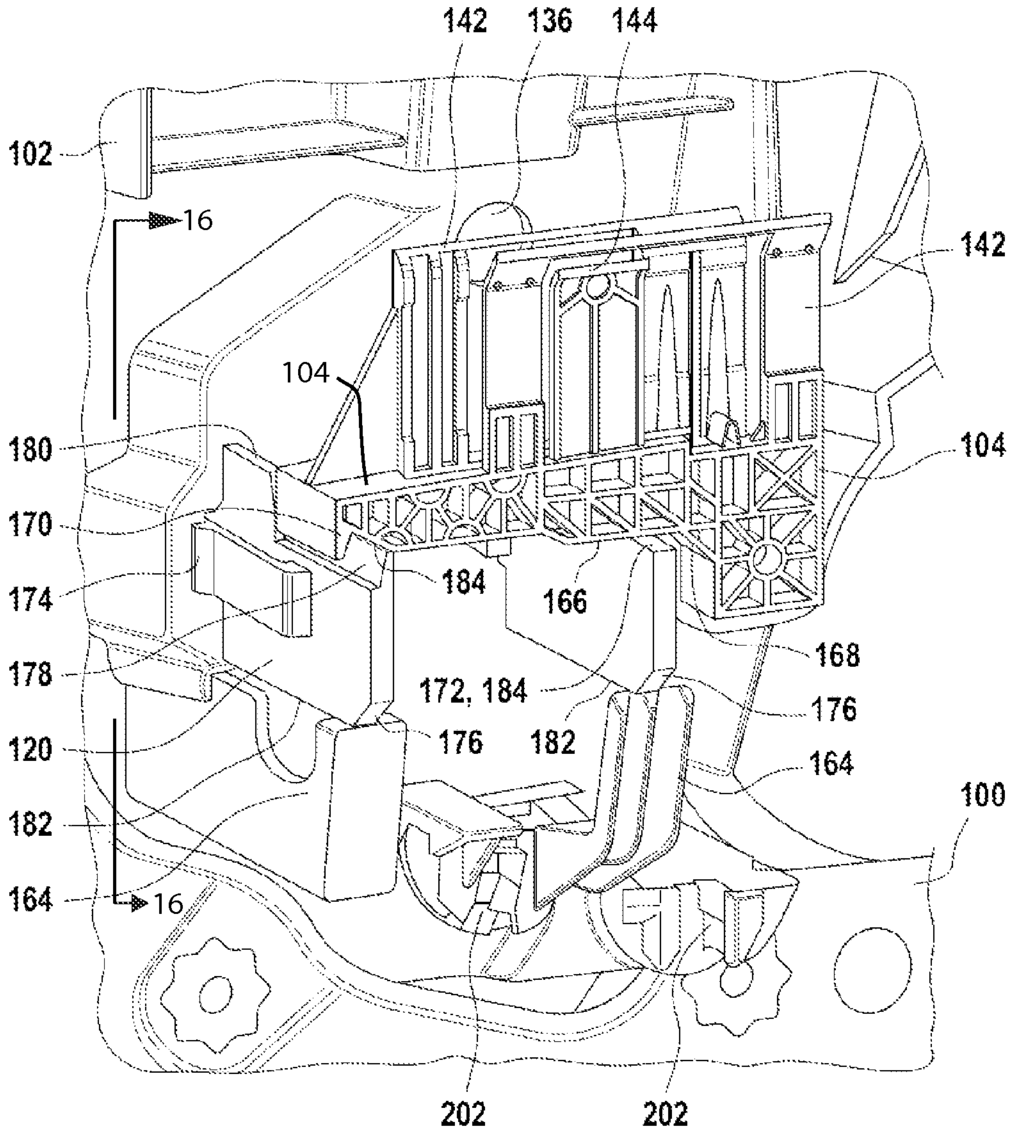
FIG. 15 Close up, perspective view showing the positioning element and the lifter in the first position.

FIG. 15 shows a perspective view of the motor vehicle door 100 and the door panel, the lifter 104 and the positioning element 120 in the first position. The perspective view shows in detail how this is assembled. The positioning element 120 is inserted through the door panel 102. It is held in place on each side by two snap connectors 174. The edge of the two prongs 188, 190 of the positioning element rest on two protrusions 164. By resting on these protrusions when the window is being installed and force is placed on the lifter 104, the force is transferred through the positioning element 120 to these protrusions 164. Above the lifter is visible the installation hole 136. It is shown in this figure that the installation hole 136 has direct access to the snap element 144 which is a component of the lifter 104. The lifter 104 is shown resting on top of the positioning element 120. The upper part of the positioning element 120 against the flanges 142 for holding the window pane are shown. Below the lifter and the positioning element 120 the two cable guides 160 are visible. A cable guide is a device which is operable for defining the position of a cable and upon which the cable is able to slide. Alternatively, in an another embodiment the cable guides could be replaced with pulleys.

FIG. 15 also shows several more design features, the first of which is that the positioning element 120 is slideably removable from the door panel. To remove the positioning element an operator would depress the snap connectors releases 174 which are located near the base of the handle 186 of the positioning element 120. The positioning element 120, is then slid out of the door panel by the operator. This is able to be accomplished because of the surfaces in contact with the protrusions 164 are parallel with those surfaces which are in contact with the lifter 104. The surfaces in contact with the protrusions are labeled as the first parallel surfaces 182 and the surfaces which are in contact with the lifter are labeled as the second parallel surfaces 184. If these surfaces were not level they would form a wedge and it would require force to remove the positioning element 120 from the first position.

Also visible on both of the prongs 188, 190 is a tapered surface 176. The purpose of this tapered surface 176 is that when the positioning element 120 is removed, the positioning element 120 clears the protrusions 164 more rapidly. As soon as the tapered surface clears the protrusion it becomes easier to remove the positioning element 120. To align the positioning element 120 and the lifter, they have interlocking surfaces. On the first prong 188 of the positioning element 120 is an angled surface 178, this mates with the mating surface for the angle surface 170 which is located on the lifter 104. The second prong 190 has a flat surface which corresponds to a flat surface 166 on the lifter. There is a lifter stop 180 located on both prongs 188, 190 of the positioning element 120. The lifter 104 butts up against the lifter stop. The cable is not shown in this figure but the cable pulls down and back and pulls the lifter against the positioning element and back against the lifter stop. The position of the cable below is controlled by two cable guides 160, which are not shown in this figure. However, the cable guide mounts 202 are shown. A cable guide mount is, as its name describes, a mounting for a cable guide. The combination of the surfaces on the lifter, the positioning element and the cable fully restrain the lifter in the first position.

Figure 16:
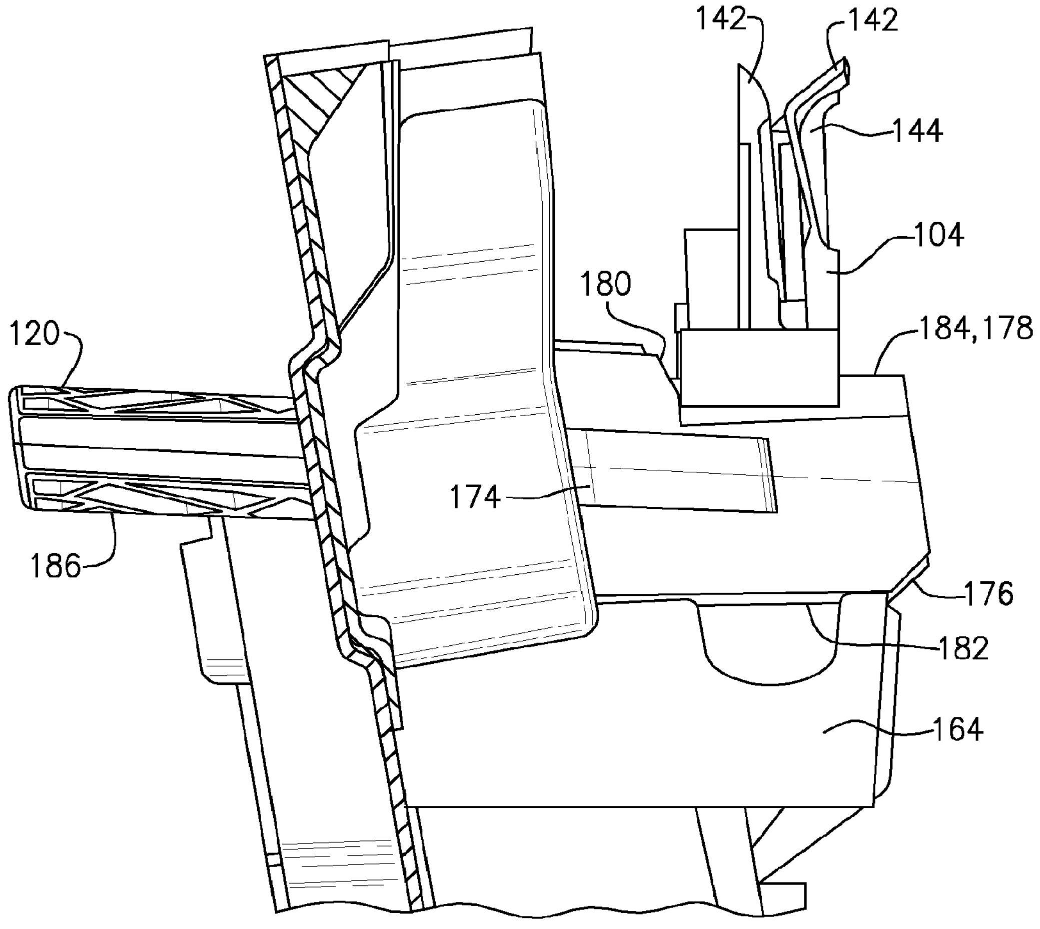
FIG. 16 Cross sectional and side view showing the positioning element and the lifter in the first position along line 16-16 of FIG. 15.

FIG. 16 shows a cross-sectional side view of the positioning element and the lifter assembled in the door panel. In this figure it can be seen how positioning element 120 rests on the protrusion 164. It is also shown in this figure how the first parallel surface 182 is parallel to the second parallel surface 184. The positioning element 120 is resting on the protrusion 164 and the window lifter is resting on the positioning element 120. When the positioning element 120 is removed the operator depresses the snap connector release 194 and simply pulls on the handle of the positioning element 186. The positioning element is then able to be slid out and the lifter is released. The lifter stop 180 is also clearly visible in this figure The stop defines how far back the lifter 104 slides on the mating surfaces 174, 172 of the positioning element 120. The flanges 142 and the snap element 144 which hold the window in place on the lifter are clearly visible in this figure also.

Figure 17:
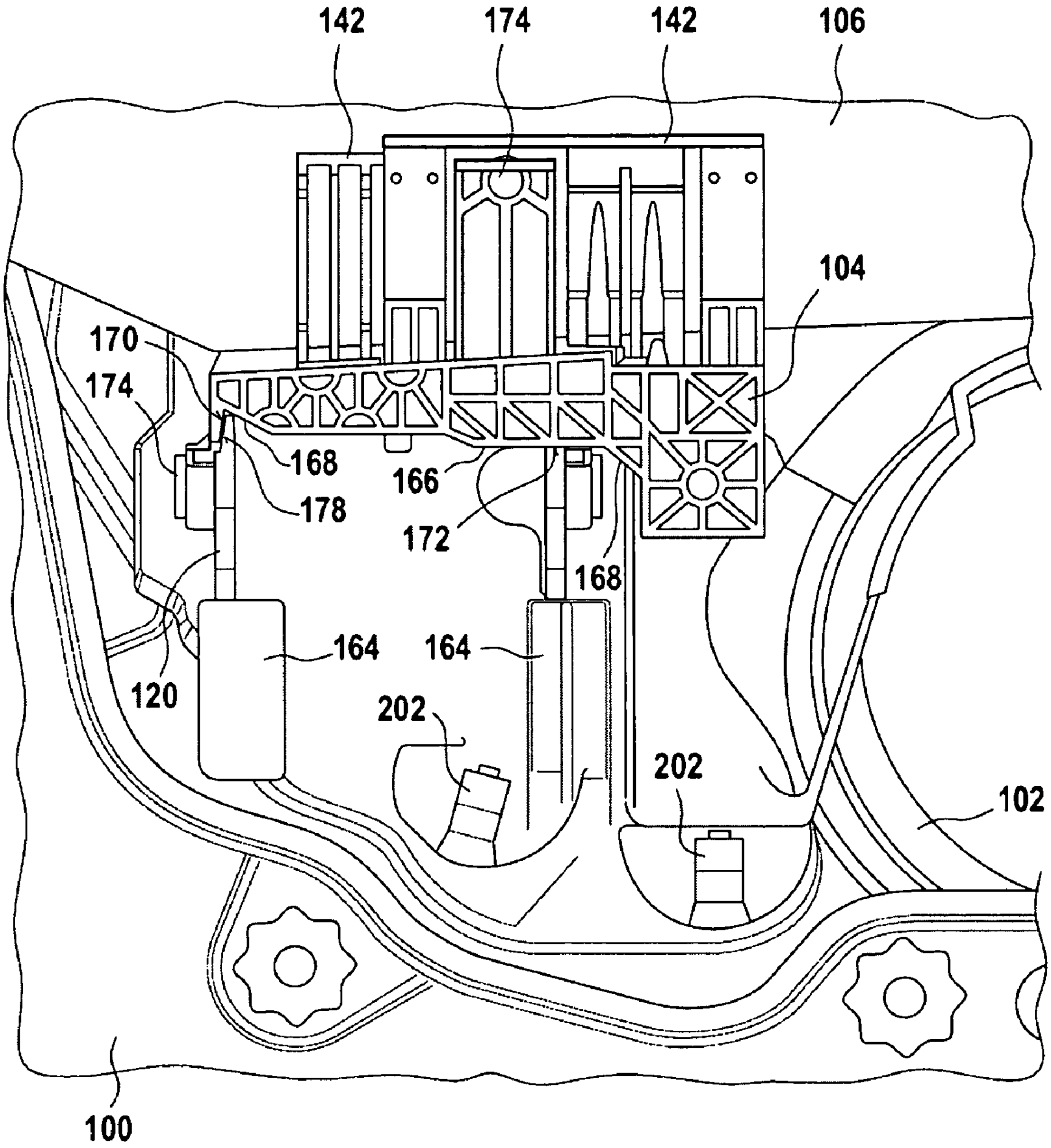
FIG. 17 Side view showing the positioning element and the lifter installed in the first position from the exterior side of the door.

FIG. 17 shows a closer view of the lifter 104 and the positioning element 120 in an assembled motor vehicle door 100. This is shown as an exterior view of the door. The window 106 is shown as being installed into the lifter 104. Below the positioning element the two cable guide mounts 202 are visible. The cable is not shown in this figure. This figure shows clearly how the lifter and the positioning element 120 are aligned. On the second prong 190, the flat surface 166 on the lifter is shown to be in contact with the flat surface on the positioning element 172. On the first prong 188, the angled surface 178 is shown as being in contact with the mating angled surface 170 on the lifter 104.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

List of Reference Marks

100 Motor vehicle door
102 door panel
104 Lifter
106 Window pane
107 Hole (in window pane)
108 Edge
110 Area
112 Upper door trim
114 Cable
116 Driving drum
118 Positioning means
120 Positioning element
122 Stop area
124 Axis
125 Axis
126 Bearing
128 Stop
130 Elastic element
132 Traverse path
134 Snap-in hook
136 Installation hole
138 Receiver slot
140 Guide pin
142 Flanges
144 Snap element
146 Recess
150 Recess
152 Locking lever
154 Clamping element
156 Bar
158 Upper pulley
160 Cable guide
162 Movement of glass
164 Protrusion
166 Flat surface
168 Sloped surface
170 Mating surface for angled surface
172 Second flat surface
174 Snap connector
176 Tapered surface
178 Angled surface
180 Lifter stop
182 First parallel surface
184 Second parallel surface
186 Handle
188 First prong
190 Second prong
192 Installation stop
194 Snap connector release
196 Slot
198 Circular elongation
200 Rectangular elongation
202 Cable guide mount

The invention claimed is:

1. A window lift arrangement comprising:
a lifter for a window pane,
a door panel, and
a positioning means for positioning the lifter relative to the door panel in an installation position for installation of the window pane,
wherein
the positioning means is comprised of at least one positioning elements, wherein the positioning means can assume a first and a second position, wherein positioning means in the first position defines the installation position, wherein positioning means in the second position enables a movement of the lifter for opening and closing the installed window pane, wherein one or more of the positioning elements are arranged in such a way that the window pane protrudes beyond an upper door trim in the installation position, wherein one or more of the positioning elements are arranged in a middle area of the door panel, wherein one or more of the positioning elements is removably mounted on the door panel and supports the lifter in the first position, and wherein one or more of the positioning elements is completely removed from the door panel in the second position.

2. The window lift arrangement of claim 1, wherein one or more of the positioning elements are movably-mounted on the door panel and are designed for removable fixing of the lifter in the first position.

3. The window lift arrangement of claim 1, wherein one or more of the positioning elements feature a contact element for removable fixing.

4. The window lift arrangement of claim 1, wherein one or more of the positioning elements are partially removable from the door panel or lifter, in order to release the movement of the lifter for opening or closing the installed window pane.

5. The window lifter arrangement of claim 1, wherein one or more of the positioning elements have a surface in contact with a surface of the lifter while in the first position, wherein the surface of the one or more positioning elements in contact with the lifter has a first profile, wherein the surface of the lifter in contact with the one or more positioning instruments has a second profile, and wherein the first and second profiles are adapted to interlock automatically during assembly, and wherein the interlocking first and second profiles restrict the motion of the lifter while in the first position.

6. The window lifter arrangement of claim 5, wherein a cable being adapted to operate the lifter during normal operation functions as a positioning element when the lifter is in the first position, and wherein the cable and the interlocking first and second profiles completely restrict the motion of the lifter while in the first position.

7. The window lifter arrangement of claim 5, wherein one or more of the positioning elements is buttressed in the first position by a protrusion extending out of the door panel.

8. The window lifter arrangement of claim 7, wherein one or more of the positioning elements is slideably engaged between the protrusion and the lifter.

9. The window lifter arrangement of claim 8, wherein one or more surfaces of the one or more positioning elements that are slideably engaged with either the protrusion or the lifter slope rapidly away.

10. The window lifter arrangement of claim 8, wherein one or more of the positioning elements that are slideably engaged are held in the first position by a clipping means.

11. The window lift arrangement of claim 1, wherein the window lift arrangement features one or more clamping elements for fixing one or more of the positioning elements in the second position, wherein one or more of the positioning elements are designed to absorb a force exerted for forming the snap-in connection, and wherein the window lift arrangement features a glass drop of almost 100%.

12. A door module with a window lift arrangement comprising:
a lifter for a window pane,
a door panel, and a positioning means for positioning the lifter relative to the door panel in an installation position for installation of the window pane, wherein the positioning means is comprised of at least one positioning element, wherein the positioning means can assume a first and a second position, wherein positioning means in the first position defines the installation position, wherein positioning means in the second position enables a movement of the lifter for opening and closing the installed window pane, wherein one or more of the positioning elements are arranged in such a way that the window pane protrudes beyond an upper door trim in the installation position, wherein one or more of the positioning elements are arranged in a middle area of the door panel, wherein one or more of the positioning elements is removably mounted on the door panel and supports the lifter in the first position, and wherein one or more of the positioning elements is completely removed from the door panel in the second position.

13. A motor vehicle door with a window lift arrangement comprising:

a lifter for a window pane, a door panel, and a positioning means for positioning the lifter relative to the door panel in an installation position for installation of the window pane, wherein the positioning means is comprised of at least one positioning element, wherein the positioning means can assume a first and a second position, wherein positioning means in the first position defines the installation position, wherein positioning means in the second position enables a movement of the lifter for opening and closing the installed window pane, wherein one or more of the positioning elements are arranged in such a way that the window pane protrudes beyond an upper door trim in the installation position, wherein one or more of the positioning elements are arranged in a middle area of the door panel, wherein one or more of the positioning elements is removably mounted on the door panel and supports the lifter in the first position, and wherein one or more of the positioning elements is completely removed from the door panel in the second position.

* * * * *